US008225257B2

(12) United States Patent
Tetelbaum (10) Patent No.: US 8,225,257 B2
(45) Date of Patent: Jul. 17, 2012

(54) REDUCING PATH DELAY SENSITIVITY TO TEMPERATURE VARIATION IN TIMING-CRITICAL PATHS

(75) Inventor: Alexander Tetelbaum, Hayward, CA (US)

(73) Assignee: LSI Corporation, Milpitas, CA (US)

( * ) Notice: Subject to any disclaimer, the term of this patent is extended or adjusted under 35 U.S.C. 154(b) by 800 days.

(21) Appl. No.: 12/251,110

(22) Filed: Oct. 14, 2008

(65) Prior Publication Data

US 2010/0095260 A1 Apr. 15, 2010

(51) Int. Cl.
*G06F 9/455* (2006.01)
*G06F 17/50* (2006.01)

(52) U.S. Cl. ......... 716/113; 716/101; 716/108; 716/134
(58) Field of Classification Search .......... 716/101, 716/108, 113, 134
See application file for complete search history.

(56) References Cited

U.S. PATENT DOCUMENTS

| 6,507,936 | B2 * | 1/2003 | Yamaguchi | 716/113 |
|---|---|---|---|---|
| 6,609,238 | B1 | 8/2003 | Tetelbaum | |
| 6,895,566 | B1 * | 5/2005 | Chan et al. | 714/725 |
| 7,222,036 | B1 * | 5/2007 | Thorne | 702/79 |
| 7,308,381 | B2 * | 12/2007 | Yonezawa | 702/179 |
| 7,571,396 | B2 * | 8/2009 | Hughes et al. | 716/100 |
| 7,669,154 | B2 * | 2/2010 | Hosono | 716/135 |
| 2002/0133789 | A1 * | 9/2002 | Hsu et al. | 716/4 |
| 2004/0254776 | A1 * | 12/2004 | Andou | 703/19 |
| 2005/0144576 | A1 * | 6/2005 | Furuta et al. | 716/4 |
| 2007/0006106 | A1 | 1/2007 | Bartling et al. | |
| 2007/0050742 | A1 * | 3/2007 | Yonezawa | 716/6 |

OTHER PUBLICATIONS

A. Dasdan et al., "Handling Inverted Temperature Dependence in Static Timing Analysis," ACM Transactions on Design Automation of Electronic Systems, Apr. 2006, pp. 306-324, vol. 11, No. 2.
A. Tetelbaum et al., "Impact of Temperature Inversion on Timing Sign-off and Design Methodology," Presented at Microprocessor Test and Verification Workshop, Dec. 2007, pp. 1-7.

* cited by examiner

*Primary Examiner* — Thuan Do
*Assistant Examiner* — Brian Ngo
(74) *Attorney, Agent, or Firm* — Otterstedt, Ellenbogen & Kammer, LLP (57) ABSTRACT

A method for reducing path delay sensitivity to temperature variation in a circuit is provided. The method includes the steps of: identifying at least one timing-critical path in the circuit, the path including a plurality of circuit cells coupled between an input and an output of the path; determining a temperature slope coefficient of the path; when the slope coefficient is negative, increasing the slope coefficient by controlling at least one characteristic of at least one of the cells in the path; and when the slope coefficient is positive, decreasing the slope coefficient by controlling at least one characteristic of at least one of the cells in the path.

20 Claims, 4 Drawing Sheets

REDUCING PATH DELAY SENSITIVITY TO TEMPERATURE VARIATION IN TIMING-CRITICAL PATHS

CROSS-REFERENCE TO RELATED APPLICATION(S)

The present application is related to a commonly assigned U.S. application entitled "Circuit Timing Analysis Incorporating the Effects of Temperature Inversion," identified by application Ser. No. 12/251,088, which issued as U.S. Pat. No. 8,181,144 on May 15, 2012, the disclosure of which is incorporated by reference herein in its entirety.

FIELD OF THE INVENTION

The present invention relates generally to the electrical, electronic, and computer arts, and more particularly relates to circuit timing analysis and design.

BACKGROUND OF THE INVENTION

Many challenges affect the ability to accurately predict the performance of circuit designs, particularly as integrated circuit (IC) fabrication process technologies migrate into sub-100 nanometer (nm) regions. Such challenges include, for example, circuit complexity, process variability and uncertainty, modeling uncertainty, variability in assumptions utilized in electronic design automation (EDA) tools, etc. In order to compensate for these uncertainties, changes that have been made to timing sign-off include signing off at specified minimum and maximum temperature corners and adding an extra margin onto the design. However, newer modeling obstacles, with varying degrees of influence, are becoming critical in achieving silicon accuracy in both analysis and implementation.

Using conventional circuit static timing analysis (STA) tools, it is assumed that circuit delay paths are fastest or slowest at specified minimum or maximum temperature corners. Traditionally, cell delay increases with rising temperature. But in sub-100 nm process designs, measurement has shown that cell delays can decrease with rising temperature. This behavior is often referred to as temperature inversion. Temperature inversion is dependent on various factors, including, for example, IC process parameters, circuit type, cell load, and supply voltage. At sub-100 nm, it has been observed that the extent of temperature dependency can vary differently with each type of cell and its load in the circuit, and such temperature dependency need not be uniform for all cells.

Conventional circuit design techniques have proved to be inadequate in terms of minimizing the susceptibility of the circuit to temperature variation effects.

SUMMARY OF THE INVENTION

Illustrative embodiments of the present invention provide techniques for advantageously minimizing the sensitivity of timing-critical paths in a circuit to temperature variation effects in order to prevent timing violations. Prediction of temperature inversion effects can beneficially be used during circuit optimization to make path delay in the circuit minimally dependent (e.g., invariant) on temperature, thereby preventing circuit failure due primarily to changes in operating temperature.

In accordance with one aspect of the invention, a method for reducing path delay sensitivity to temperature variation in a circuit is provided. The method includes the steps of: identifying at least one timing-critical path in the circuit, the path including a plurality of circuit cells coupled between an input and an output of the path; determining a temperature slope coefficient of the path; when the slope coefficient is negative, increasing the slope coefficient by controlling at least one characteristic of at least one of the cells in the path; and when the slope coefficient is positive, decreasing the slope coefficient by controlling at least one characteristic of at least one of the cells in the path.

The steps of increasing or decreasing the slope coefficient may include, for at least a current cell in the path, controlling an output slew rate of the current cell, controlling an output slew rate of a cell coupled to and immediately preceding the current cell, controlling an output load of the current cell, and/or controlling the drive strength (or other properties) of the current cell. The step of increasing the slope coefficient and/or decreasing the slope coefficient preferably includes controlling at least one characteristic of at least one of the cells in the path so that the slope coefficient of the path is within a prescribed range of zero.

In accordance with another aspect of the invention, an apparatus for reducing path delay sensitivity to temperature variation in a circuit includes memory and at least one processor coupled to the memory. The processor is operative: (i) to identify at least one timing-critical path in the circuit, the path including a plurality of circuit cells coupled between an input and an output of the path; (ii) to determine a temperature slope coefficient of the path; (iii) when the slope coefficient is negative, to increase the slope coefficient by controlling at least one characteristic of at least one of the cells in the path; and (iv) when the slope coefficient is positive, to decrease the slope coefficient by controlling at least one characteristic of at least one of the cells in the path.

These and other features, aspects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of exemplary optimization methodologies for minimizing the impact of temperature inversion on path delay in a circuit in order to prevent timing violations. It is to be understood, however, that the techniques of the present invention are not limited to the methodologies shown and described herein. Rather, embodiments of the invention are directed broadly to techniques for advantageously reducing path delay sensitivity to temperature variation in timing-critical paths. In this manner, a more robust circuit design can be achieved. Although reference may be made herein to n-channel metal-oxide-semiconductor (NMOS) or p-channel metal-oxide-semiconductor (PMOS) transistor devices which may formed using a complementary metal-oxide-semiconductor (CMOS) IC fabrication process, the invention is not limited to such devices and/or such an IC fabrication process.

Inverted temperature dependence (ITD), also referred to herein as temperature inversion, has drawn considerable attention recently as IC process technology continues scaling below 100 nm. The temperature inversion phenomenon typically occurs, or is at least more prevalent, when a circuit is operated at low supply voltage levels (e.g., about one volt or less). When the circuit is operated at low supply voltage, the propagation delay of a cell in the circuit may decrease as the temperature increases, which is contrary to an intuitive understanding that cell delay generally increases with increasing temperature. The term "cell" as used herein is intended to broadly refer to a functional circuit or combination of circuits, generally employed as a sub-block (i.e., sub-circuit) in a larger circuit. At high supply voltages, electron mobility largely determines drain current in a transistor device, but at low supply voltages, transistor device threshold voltage, Vth, is the dominant factor in determining drain current. Thus, delay increases or decreases with increasing temperature depending primarily on the magnitude of the supply voltage. A principal reason behind this reversed temperature dependence effect is due to the effect of temperature change on the threshold voltage.

More particularly, as supply voltage is scaled with the advance of the IC process technology, the value of |Vgs−Vth| also decreases, where Vgs is a gate-source voltage applied to the transistor device. Hence, the smaller quantity |Vgs−Vth| makes it more sensitive to changes in Vth due to temperature. On the other hand, propagation delay is also proportional to electron mobility, which decreases as temperature increases. Therefore, the overall effect of temperature inversion, whether speeding up or slowing down the propagation delay, will be determined by the dominate factor of the two. The voltage where temperature dependence reverses (or inverts) is often referred to as the crossover voltage, the zero-temperature coefficient (ZTC) voltage, or the inversion voltage. This possible reverse dependency of propagation delay on temperature raises a new concern in a multiple corners timing sign-off methodology.

Timing sign-off plays an important role in design flow, essentially serving as a last check before taping off for IC fabrication. Using STA tools to perform sign-off, a pre-characterized cell library is generated based, for example, on circuit simulation results using SPICE (Simulation Program with Integrated Circuit Emphasis), or the numerous variants thereof, including but not limited to, HSPICE® (a registered trademark of Synopsys, Inc.), PSpice® (a registered trademark of Cadence Design Systems, Inc.), IS_Spice, and Micro-Cap IV, under one or more PVT conditions. PVT refers to three primary elements that determine a cell's performance, namely, process (P), voltage (V), and temperature (T). The combination of P, V, and T is generally referred to as a PVT condition, and when one or more of the three variables P, V, or T is at a minimum or maximum prescribed value, it is generally referred to as a PVT corner. The P corner determines the electrical properties of the device, while the V and T corners are indicative of the operating environment under which the devices in the cell are characterized.

Timing sign-off has evolved from single nominal corner sign-off, to two corners PVT fast and slow corner sign-off, then to four corners PV fast and slow corner with hot and cold temperature sign-off. The purpose of a multiple corners timing sign-off methodology is to ensure that the extreme cases are checked during the analysis, which assumes that cell and/or path delays are fastest at a specified minimum temperature (best) corner and slowest at a specified maximum temperature (worst) corner. Before the ITD effect was discovered, all cells were assumed to have their switching behaviors slow down as temperature increased. Under such assumptions, designers did not need to be concerned with the relationship between delay and temperature. However, with the presence of the ITD effect, this assumption is no longer guaranteed because cells may operate faster at the highest specified temperature or even at some intermediate temperature. Moreover, the worst-case temperature may be different for different cells, loads and input signal slews, and for different paths, all of which further complicates the problem of trying to accurately predict circuit timing.

Cell and path delays may behave nonmonotonically as a function of temperature. Thus, worst case delay (minimum or maximum) may occur between prescribed temperature corners. In addition, even when minimum and maximum cell delays are observed at the temperature corners, implying that at any intermediate temperature, the cell delay is between the respective delays corresponding to the temperature corners, the path delay still may have minimum or maximum delay at an intermediate temperature.

Consequently, temperature inversion may lead to sign-off issues. Moreover, delay estimation may become highly complex if the effects of on-chip temperature variations and temperature inversion on path delays are taken into account. By optimizing the circuit design to reduce path delay sensitivity to such temperature variations, a more robust circuit can be formed, without the need for more accurate circuit simulation tools for performing timing analysis.

In general, cell delay is not necessarily linear. Moreover, cell delay need not even be a monotonic function of temperature T. Assume, for purposes of illustration, that current timing sign-off for each sign-off corner is performed to two temperatures, namely, $T=T_{min}$ and $T=T_{max}$, because of the impact of timing inversion on delay D(P) of each signal path P, where $T_{min}$ and $T_{max}$ are prescribed minimum and maximum temperatures of operation of the cell, respectively. It is assumed that either path delay $D(P)=D(P, T_{min})$ or $D(P)=D(P, T_{max})$ will be indicative of the minimum or maximum delay, respectively, for signal path P in the cell.

The above statement with regard to path delay in cell C holds true when the cell delay D(C, T) of cell C is a linear function of temperature T, such that:

$$D(C,T)=a(C)T+b(C),$$

where a and b are constants for cell C. Note that a<0 for cells exhibiting temperature inversion, at least for one or more ramp-time and/or load combinations.

As proof of the above statement, assume that path P in a given circuit comprises cells {1, 2, ..., N}, where N is an integer greater than 1. Then path delay D(P, T) in the circuit may be determined in accordance with following expression:

$$D(P, T) = \sum_{C=1}^{N} D(C, T)$$

$$= \sum_{C=1}^{N} [a(C)T + b(C)]$$

$$= AT + B$$

where:

$$A = \sum_{C=1}^{N} a(C) = const$$

$$B = \sum_{C=1}^{N} b(C) = const$$

Thus, each signal path P in the circuit may experience temperature inversion (e.g., A<0) or may not experience temperature inversion (e.g., A>0) depending on the combination(s) of cells in the path and their respective ramp-times and/or loads.

As stated above, cell delay D(C, T) may be not a linear function of temperature T. Furthermore, cell delay may be nonmonotonic, such that the cell delay D(C, T) at some intermediate temperature $T_{int}$, between a prescribed minimum temperature $T_{min}$ and a prescribed maximum temperature $T_{max}$, may be greater or less than a delay $D(C,T_{min})$ of the cell C at the minimum temperature, or a delay $D(C,T_{max})$ of the cell at the maximum temperature. This implies that path delay D(P,T) in a circuit including one or more cells may also be nonmonotonic with respect to temperature, such that the path delay D(P,T) at some intermediate temperature $T_{int}$, between the prescribed minimum temperature $T_{min}$ and the prescribed maximum temperature $T_{max}$, may be greater or less than a delay $D(P,T_{min})$ of the path at the minimum temperature, or a delay $D(P,T_{max})$ of the path at the maximum temperature corresponding to the PVT corners for timing sign-off.

Regardless of whether or not the relationship between path delay and temperature is linear, by minimizing the temperature-dependent term in the path delay equation for a given timing-critical path in a circuit, a sensitivity of the given timing-critical path to temperature variations will be beneficially reduced. For example, using the expression for path delay D(P,T)=AT+B noted above, by reducing the variable A, which may be referred to herein as a slope coefficient, associated with the temperature-dependent term AT, the impact of temperature variation on path delay is also reduced. Ideally, when A is reduced to zero, the temperature-dependent term (AT) in the delay equation will disappear, and path delay will therefore be essentially independent of temperature.

The slope coefficient A can be minimized, in accordance with embodiments of the present invention, by selecting (e.g., tuning) ramp-times and/or loads corresponding to one or more cells in a given circuit, or by replacing at least one cell in the given circuit with a functionally equivalent cell having different timing properties, such as, for example, different transistor threshold voltage, different input and/or output impedance, etc. This may be accomplished, for example, during timing optimization of timing-critical paths in the circuit, as will be described in further detail herein below.

By way of example only, and without loss of generality, let Po represent one of a plurality of timing-critical paths, P, in a given circuit which has been optimized using standard circuit optimization techniques. Examples of known optimization techniques include changing the physical location of a cell, cell type, and/or routing in order to minimize some criteria (e.g., power consumption) and restrict certain path properties. Let Ao represent a slope coefficient corresponding to the optimized path Po. Additional optimization steps can be performed that will advantageously minimize the slope coefficient from Ao to $A_{min}$, where $A_{min}$ is less than Ao, while preserving other timing properties of path Po, such as, for example, overall (e.g., total) path delay.

Figure 1:
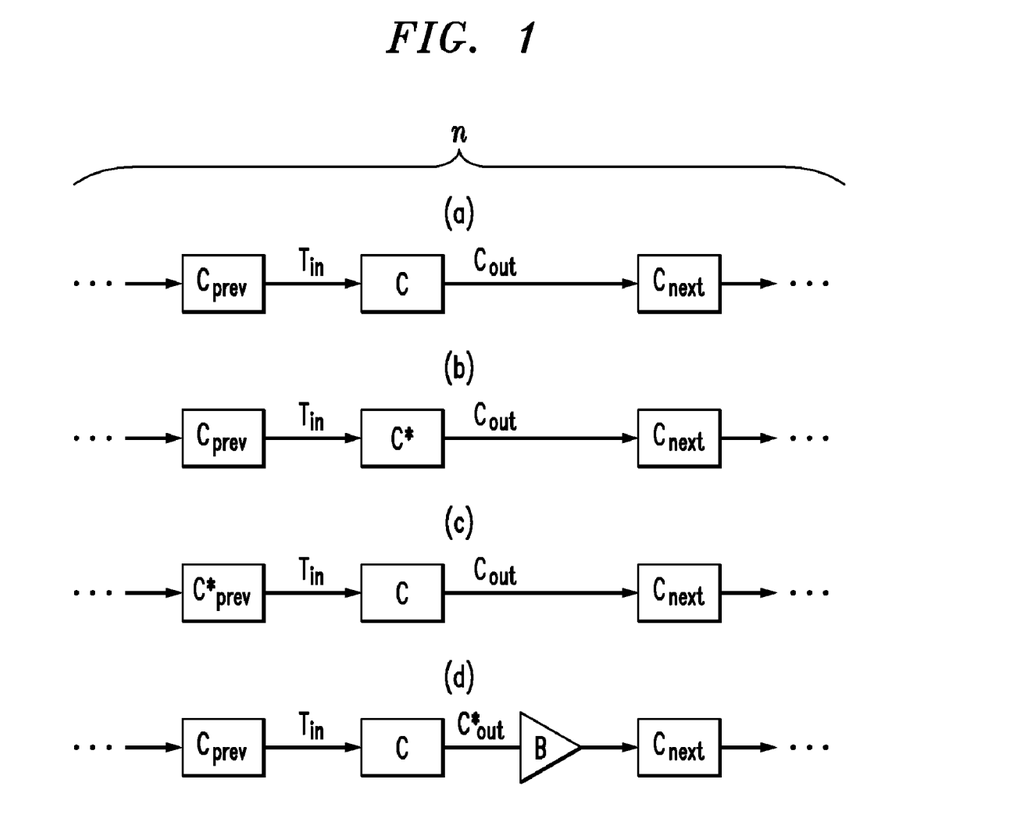
FIGS. 1(a) through 1(d) depict at least a portion of a signal path, wherein exemplary optimization methodologies are used to reduce path delay sensitivity to temperature variation in the path, according to embodiments of the present invention.

FIGS. 1(a) through 1(d) depict at least a portion of a signal path, wherein exemplary optimization methodologies are used to reduce path delay sensitivity to temperature variation in the path, according to embodiments of the invention. Specifically, FIG. 1(a) illustrates a signal path P=($C_1, C_2, \ldots, C_n$) including n cells (C), where n is an integer greater than zero, before temperature optimization has been performed. With reference to FIG. 1(a), C represents a current cell in the path, $C_{prev}$ represents a cell coupled to and immediately preceding the current cell, and $C_{next}$ represents a cell coupled to and immediately following the current cell. The current cell C is adapted to receive, as an input, a first signal having an input ramp-time, $T_{in}$, generated by the immediately preceding cell $C_{prev}$, and to generate, as an output, a second signal having a load, $C_{out}$, associated therewith, supplied to the immediately following cell $C_{next}$. In FIGS. 1(a) through 1(d), an asterisk (*) is used to designate a cell, signal, or cell property that has been modified in order to reduce the slope coefficient, and thereby minimize the temperature-dependent component of the path delay.

FIG. 1(b) illustrates a methodology wherein a strength of the current cell C is selectively controlled, as represented by C*, to optimize a sensitivity of path P to temperature variations, according to an embodiment of the invention. The strength, or drive strength, of a cell may be controlled, for example, by adjusting a size (e.g., as a ratio of channel width to channel length) of one or more NMOS or PMOS devices in an output drive stage of the cell. One measure of the strength of a cell is output slew rate; thus, higher slew rate generally corresponds to higher drive strength.

FIG. 1(c) illustrates a methodology according to another embodiment of the invention wherein input ramp-time $T_{in}$ to the current cell C is selectively controlled by modifying a strength of the immediately preceding cell $C_{prev}$, as represented by $C^*_{prev}$, to optimize the sensitivity of path P to temperature variations. In FIG. 1(d), a methodology according to an embodiment of the invention is shown wherein a current cell load $C_{out}$ is selectively controlled by inserting a buffer, B, having a prescribed load characteristic, between an output of the current cell C and an input of the immediately following cell $C_{next}$, as represented by $C^*_{out}$. It is to be appreciated that one or more of the above-noted methodologies may be used, either individually or in combination, to beneficially optimize a sensitivity of path P to temperature variations.

Figure 2:
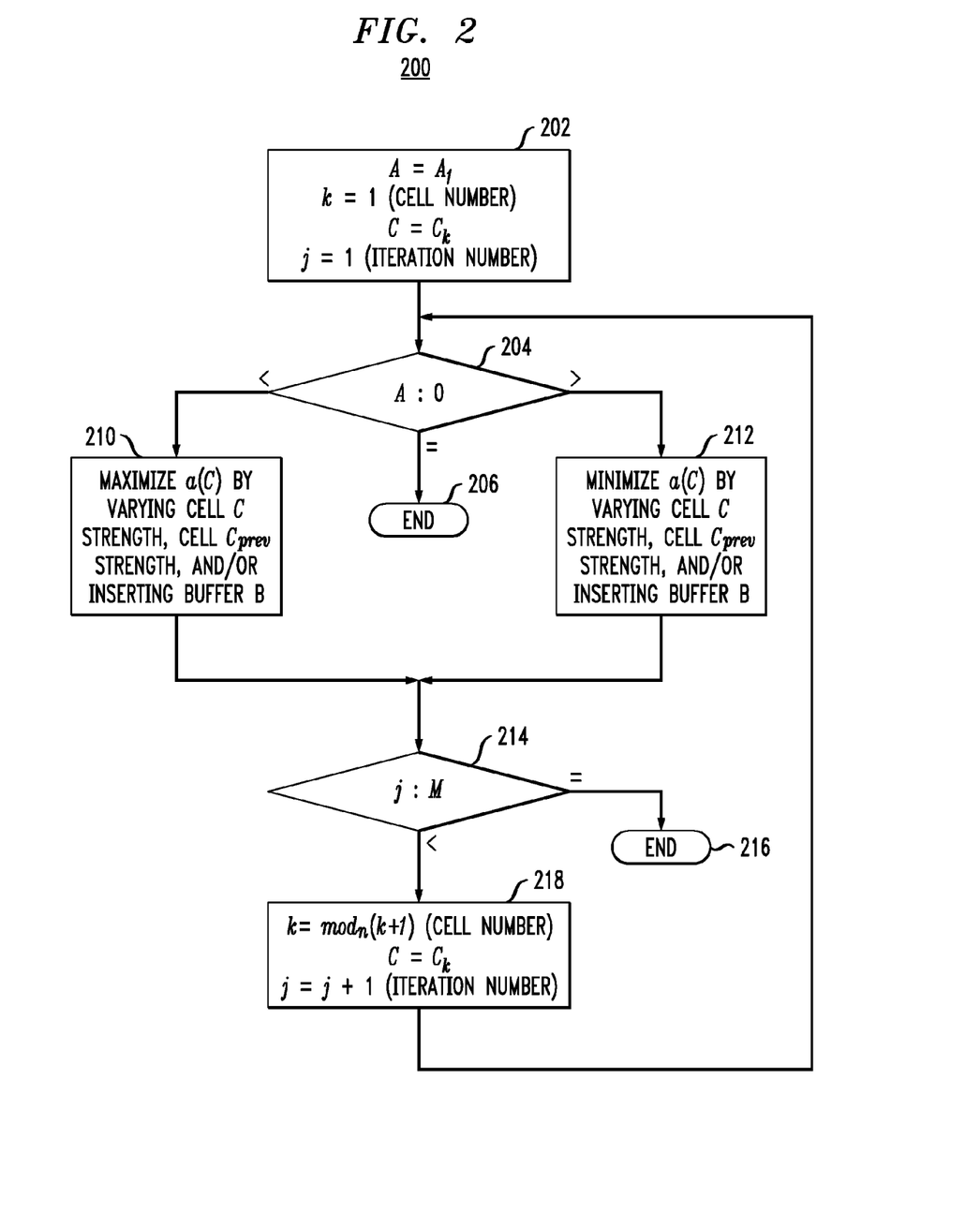
FIG. 2 is a flow diagram depicting an exemplary optimization method for reducing path delay sensitivity to temperature variation in a timing-critical path, in accordance with an embodiment of the present invention.

FIG. 2 is a flow diagram depicting an exemplary optimization method 200 for reducing path delay sensitivity to temperature variation in a timing-critical path, in accordance with an embodiment of the present invention. Method 200 assumes that all timing-critical paths in a given circuit have already been identified, which can be accomplished using standard STA tools (e.g., PrimeTime, a product of Synopsys, Inc.). In an illustrative embodiment, a Quartus® (a registered trademark of Altera Corporation) II TimeQuest timing analyzer may be used to perform timing analysis of a given design. The optimization method 200 is preferably performed iteratively for each of n cells in a given path, where n is an integer greater than one. Method 200 is preferably limited to a prescribed maximum number, M, of optimization iterations, j, performed for each cell, k, where M, j and k are all integers. It is to be understood that the invention is not limited to any particular number of maximum optimization iterations performed.

In step 202, certain variables used in the optimization method 200 are initialized. Specifically, the cell number k is initially set equal to one, indicative of the first cell ($C_1$), and the iteration number j is initially set to one, indicative of the first iteration of the optimization method. Thus, k is a cell number counter and j is an iteration number counter. Additionally, the current cell C is set to cell $C_k$ (initially, cell $C_1$), and the temperature slope coefficient A of the path is set equal to $A_1$, which is initially the measured slope coefficient of the unoptimized path. As stated above, the slope coefficient A may be determined as a sum of the temperature slope coefficients, a(C), for each cell in the path (e.g., $$A = \sum_{C=1}^{n} a(C),$$

where n is the total number of cells in the path). Furthermore, each slope coefficient a(C) can be obtained from cell delay libraries for different temperature values. It is assumed that, as part of cell characterization information obtained for each of the cells, such delay libraries or delay tables already exist which show cell delay as a function of temperature and/or other cell properties (e.g., supply voltage, etc.).

In step 204, the slope coefficient A is compared with zero. This may accomplished, for example, using a comparator or alternative comparison circuitry. When A is equal to zero (or within a prescribed threshold of zero), the temperature-dependent component of the path delay is reduced to zero (or substantially zero), which is a primary objective of the optimization method 200.

If it is determined in step 204 that A is equal to zero, the method ends at step 206, since no further optimization is required. If A is found to be less than zero (indicative of a negative temperature coefficient), step 210 is performed, wherein the slope coefficient a(C) of the path, as a function of the current cell, is maximized by modifying the drive strength of current cell C, by modifying the drive strength of the immediately preceding cell $C_{prev}$, by inserting at least one buffer B between the output of the current cell C and the input of the next cell $C_{next}$ immediately following the current cell, and/or by controlling other properties of the current cell. The method 200 then continues at step 214. Similarly, if it is determined, during comparison step 204, that A is greater than zero (indicative of a positive temperature coefficient), step 212 is performed, wherein the slope coefficient a(C) of the path, as a function of the current cell, is minimized by modifying the strength of cell C, modifying the strength of cell $C_{prev}$, by inserting at least one buffer B between the output of cell C and the input of cell $C_{next}$, and/or by controlling other properties of the cell. The method then continues at step 214. Exemplary methods for implementing steps 212 and 210 will be described in further detail below with reference to FIGS. 3 and 4, respectively.

In step 214, the iteration number counter j is checked to determine whether or not the maximum number of optimization iterations M has been reached. This can be accomplished, according to an embodiment of the invention, by comparing j and M. If j is equal to M, which is indicative of reaching the maximum number of optimization iterations, the method 200 ends at step 216. If j is less than M, which is indicative of not reaching the maximum number of optimization iterations, the method continues at step 218, where the cell number counter k and the iteration number counter j are each increment by one, or alternative increment value, and the current cell C is set to the next cell in the path. Note, that after k exceeds n, k starts over again from 1 (as part of the $mod_n$ function). It is to be appreciated that the increment value need not be equal to one. Furthermore, the increment values for k and j need not be the same. The optimization method 200 is then repeated for the next iteration and/or cell by continuing to comparison step 204.

Figure 3:
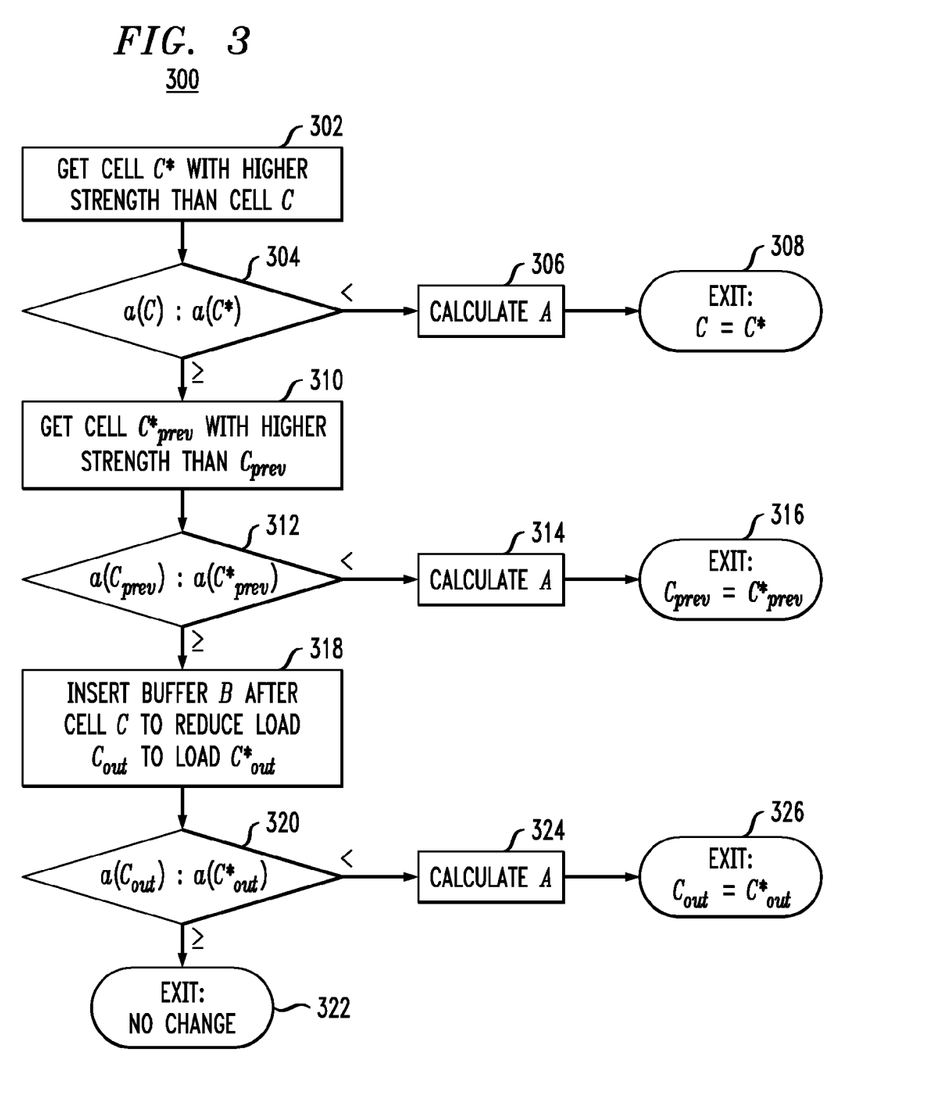
FIG. 3 is a flow diagram depicting an exemplary method for minimizing the slope coefficient of a given signal path in a circuit as a function of a current cell C, in accordance with an embodiment of the present invention.

With reference now to FIG. 3, an exemplary method 300 for minimizing the slope coefficient a(C) of the path as a function of the current cell C is shown, according to an embodiment of the invention. Method 300 may be employed, for example, in step 212 of the optimization method 200 shown in FIG. 2. Method 300 begins in step 302, wherein a new current cell C* is obtained having a higher drive strength relative to the current cell C in the path. As previously stated, the strength of a cell can be controlled by modifying a channel width-to-length (W/L) ratio of one or more transistor devices in an output stage of the cell. For example, the strength of a cell can be to increase by selectively increasing the W/L ratio of one or more PMOS and/or NMOS devices in the output stage of the cell. Next, in step 304, a slope coefficient a(C) of the path, as a function of the current cell C, is compared with a slope coefficient a(C*) of the path, as a function of the new current cell C* having the higher drive strength. If a(C) is less than a(C*), the slope coefficient A of the overall path is calculated in step 306 and the method exits at 308 with the current cell C being replaced by the new current cell C* having the higher strength (i.e., C=C*). Alternatively, if a(C) is greater than or equal to a(C*), method 300 continues at step 310.

In step 310, a new previous cell $C^*_{prev}$ is obtained having a higher drive strength relative to the existing previous cell $C_{prev}$ in the path. In a manner consistent with that described above in conjunction with step 302, this may be accomplished, for example, by selectively increasing the W/L ratio of one or more PMOS and/or NMOS devices in the output stage of the cell, although alternative methods for increasing the strength of the cell are contemplated. Slope coefficients $a(C_{prev})$ and $a(C^*_{prev})$ of the path as a function of the existing previous cell $C_{prev}$ and the new previous cell $C^*_{prev}$, respectively, are then compared to one another in step 312. If $a(C_{prev})$ is less than $a(C^*_{prev})$, slope coefficient A of the overall path is calculated in step 314 and the method exits at 316 with the previous cell $C_{prev}$ being replaced by the new previous cell $C^*_{prev}$ having the higher strength (i.e., $C_{prev}=C^*_{prev}$). Alternatively, if $a(C_{prev})$ is greater than or equal to $a(C^*_{prev})$ method 300 continues at step 318.

In step 318, at least one buffer B is inserted in the path between an output of the current cell C and an input of the next cell $C_{next}$. As previously stated, buffer B preferably functions to modify a load $C_{out}$ of the current cell. In this instance, buffer B is inserted in attempt to modify load $C_{out}$ to load $C^*_{out}$, where $C^*_{out}$ is less than $C_{out}$. Next, a slope coefficient $a(C_{out})$ of the path, as a function of the load $C_{out}$ of the current cell, is compared to a slope coefficient $a(C^*_{out})$ of the path, as a function of the modified load $C^*_{out}$ of the current cell in step 320. If $a(C_{out})$ is greater than or equal to $a(C^*_{out})$, the method 300 exits with no change at 322. This implies that none of the modifications to the strength of the current cell, the strength of the previous cell, or the load of the current cell, is effective at reducing the slope coefficient as a function of the various measured parameters. If, however, $a(C_{out})$ is determined to be less than $a(C^*_{out})$ in step 320, the method proceeds to step 324 wherein the slope coefficient A of the overall path is calculated. The method then exits at 326 with the load of the current cell $C_{out}$ being replaced by the new load $C^*_{out}$ (i.e., $C_{out} = C^*_{out}$).

Figure 4:
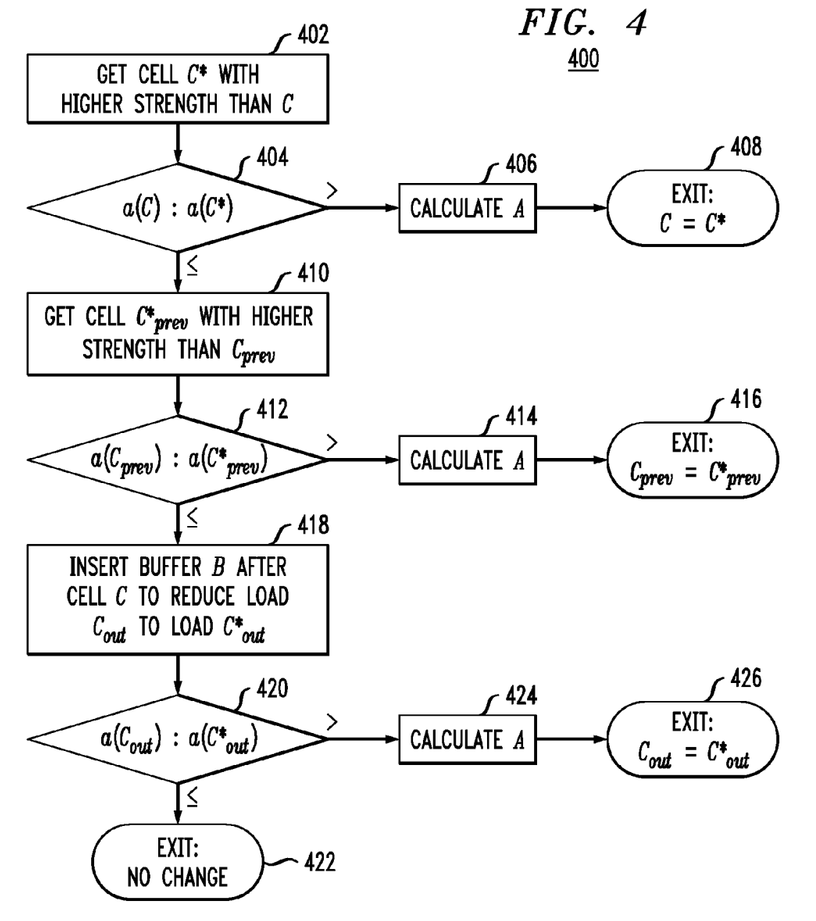
FIG. 4 is a flow diagram depicting an exemplary method for maximizing the slope coefficient of a given path in a circuit as a function of a current cell C, in accordance with an embodiment of the present invention.

With reference now to FIG. 4, an exemplary method 400 for maximizing the slope coefficient a(C) of the path as a function of the current cell C is shown, according to an embodiment of the invention. Method 400 may be employed, for example, in step 210 of the optimization method 200 shown in FIG. 2. Method 400 begins in step 402, wherein a new current cell C* is obtained having a higher drive strength relative to the current cell C in the path. The strength of a cell can be controlled by modifying a channel W/L ratio of one or more transistor devices in an output stage of the cell, as previously explained. Next, in step 404, a slope coefficient a(C) of the path, as a function of the current cell C, is compared with a slope coefficient a(C*) of the path, as a function of the new current cell C* having the higher drive strength. If a(C) is greater than a(C*), the slope coefficient A of the overall path is calculated in step 406 and the method exits at 408 with the current cell C being replaced by the new current cell C* having the higher strength (i.e., C=C*). Alternatively, if a(C) is less than or equal to a(C*), method 400 continues at step 410.

In step 410, a new previous cell $C^*_{prev}$ is obtained having a higher drive strength relative to the existing previous cell $C_{prev}$ in the path. In a manner consistent with that described above in conjunction with step 402, this may be accomplished, for example, by selectively increasing the W/L ratio of one or more PMOS and/or NMOS devices in the output stage of the cell, although alternative methods for increasing the strength of the cell are contemplated. Slope coefficients $a(C_{prev})$ and $a(C^*_{prev})$ of the path as a function of the existing previous cell $C_{prev}$ and the new previous cell $C^*_{prev}$, respectively, are then compared to one another in step 412. If $a(C_{prev})$ is greater than $a(C^*_{prev})$, slope coefficient A of the overall path is calculated in step 414 and the method exits at 416 with the previous cell $C_{prev}$ being replaced by the new previous cell $C^*_{prev}$ having the higher strength (i.e., $C_{prev} = C^*_{prev}$). Alternatively, if $a(C_{prev})$ is less than or equal to $a(C^*_{prev})$, method 400 continues at step 418.

In step 418, at least one buffer B is inserted in the path between an output of the current cell C and an input of the next cell $C_{next}$. Buffer B preferably functions to modify a load $C_{out}$ of the current cell. In this instance, buffer B is inserted in attempt to modify load $C_{out}$ to load $C^*_{out}$, where $C^*_{out}$ is less than $C_{out}$. Next, a slope coefficient $a(C_{out})$ of the path, as a function of the load $C_{out}$ of the current cell, is compared to a slope coefficient $a(C^*_{out})$ of the path, as a function of the modified load $C^*_{out}$ of the current cell in step 420. If $a(C_{out})$ is less than or equal to $a(C^*_{out})$, the method 400 exits with no change at 422. This implies that none of the modifications to the strength of the current cell, the strength of the previous cell, or the load of the current cell, is effective at reducing the slope coefficient as a function of the various measured parameters. If, however, $a(C_{out})$ is determined to be greater than $a(C^*_{out})$ in step 420, the method proceeds to step 424 wherein the slope coefficient A of the overall path is calculated. The method then exits at 426 with the load of the current cell $C_{out}$ being replaced by the new load $C^*_{out}$ (i.e., $C_{out} = C^*_{out}$).

Figure 5:
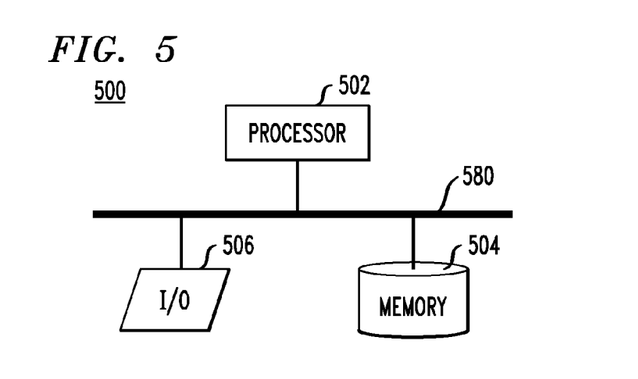
FIG. 5 is block diagram depicting an exemplary system in which techniques of the present invention may be implemented, in accordance with an embodiment of the invention.

One or more embodiments of the invention can make use of software running on a general purpose computer or workstation. With reference to FIG. 5, such an implementation might employ might employ, for example, a processor 502, a memory 504, and an input/output (I/O) interface 506 which may include, for example, a display and a keyboard (not explicitly shown). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and I/O interface 506 can be interconnected, for example, via bus 508 as part of a data processing unit 500. Suitable interconnections, for example via bus 508, can also be provided to a network interface (not explicitly shown), such as a network card, which can be provided to interface with a computer network, and to a media interface, such as a diskette or CD-ROM drive, which can be provided to interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 504), magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

An electronic system, preferably a data processing system, suitable for storing and/or executing program code will include at least one processor 502 coupled directly or indirectly to memory elements 504 through system bus 508. The memory elements can include local memory employed during actual execution of the program code, bulk storage, and cache memories which provide temporary storage of at least some program code in order to reduce the number of times code must be retrieved from bulk storage during execution.

Network adapters such as network interface (not explicitly shown) may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the methodology illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least a portion of the circuits and methodologies of the present invention may be implemented in one or more integrated circuits. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An integrated circuit in accordance with the present invention can be employed in any application and/or electronic system which may be adversely affected by temperature inversion. Suitable systems for implementing techniques of the invention may include, but are not limited to, personal computers, timing circuitry, communication networks, electronic instruments (e.g., automated test equipment (ATE)), interface networks, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for reducing path delay sensitivity to temperature variation in a circuit, the method comprising the steps of
    providing a system comprising a tangible, computer-readable recordable storage medium, embodying in a non-transitory manlier first, second, and third computer instructions;
    identifying at least one path between an input and an output of the circuit that introduces to a signal passing therebetween a largest delay front the input of the circuit to the output of the circuit, the path including a plurality of circuit cells coupled between an input and an output of the path, by executing said first computer instructions on at least one hardware processor;
    determining a temperature slope coefficient of the path, by executing said second computer instructions on at least one hardware processor;
    when the slope coefficient is negative, increasing the slope coefficient by controlling at least one characteristic of at least one of the cells in the path, by executing said third computer instructions on at least one hardware processor; and
    when the slope coefficient is positive, decreasing the slope coefficient by controlling at least one characteristic of at least one of the cells in the path, by executing said third computer instructions on at least one hardware processor.

2. The method of claim 1, wherein the step of determining the slope coefficient comprises, for each of the plurality of cells, determining a temperature slope coefficient of the path as a function of a current cell in the path.

3. The method of claim 1, wherein the step of determining the slope coefficient comprises measuring a temperature slope coefficient of the path as a function of at least a current cell in the path and comparing the measured slope coefficient to zero.

4. The method of claim 1, wherein the steps of determining the slope coefficient, increasing the slope coefficient and decreasing the slope coefficient are performed iteratively for each of the plurality of cells in the path until the slope coefficient of the path is within a prescribed range of zero.

5. The method of claim 4, further comprising the step of setting a maximum number of iterations for performing the steps of determining the slope coefficient, increasing the slope coefficient and decreasing the slope coefficient.

6. The method of claim 4, wherein the step of determining the slope coefficient comprises determining a temperature slope coefficient of the path as a function of a current cell in the path, the method further comprising the steps of initializing a first counter for tracking a number of the current cell in the path and initializing a second counter for tracking an iteration number.

7. The method of claim 1, wherein the step of decreasing the slope coefficient comprises, for at least a current cell in the path, at least one of controlling an output slew rate of the current cell, controlling an output slew rate of a cell coupled to and immediately preceding the current cell, and controlling an output load of the current cell.

8. The method of claim 1, wherein the step of increasing the slope coefficient comprises, for at least a current cell in the path, at least one of controlling an output slew rate of the current cell, controlling an output slew rate of a cell coupled to and immediately preceding the current cell, and controlling an output load of the current cell.

9. The method of claim 1, wherein at least one of the step of increasing the slope coefficient and decreasing the slope coefficient comprises controlling at least one characteristic of at least one of the cells, in the path so that the slope coefficient of the path is within a prescribed range of zero.

10. A method for reducing path delay sensitivity to temperature variation in a circuit, the method comprising the steps of:
    identifying at least one timing-critical path in the circuit, the path including a plurality of circuit cells coupled between an input and an output of the path;
    using a computer to determine a temperature slope coefficient of the path;
    when the slope coefficient is negative, increasing the slope coefficient by controlling at least one characteristic of at least one of the cells in the path; and
    when the slope coefficient is positive, decreasing the slope coefficient by controlling at least one characteristic of at least one of the cells in the path,
    wherein the step of decreasing the slope coefficient comprises, for at least a current cell in the path, at least one of controlling an output slew rate of the current cell, controlling an output slew rate of a cell coupled to and immediately preceding the current cell, and controlling an output load of the current cell, and
    wherein the step of controlling the output slew rate of the current cell comprises:
        obtaining anew current cell having a higher drive strength than the current cell in the path;
        comparing a first temperature slope coefficient of the path, as a function of the current cell, with a second temperature slope coefficient of the path, as a function of the new current cell having the higher drive strength; and when the first temperature slope coefficient is less than the second temperature slope coefficient, calculating an overall temperature slope coefficient of the path and replacing the current cell with the new current cell.

11. The method of claim 10, wherein the step of obtaining a new current cell having a higher drive strength than the current cell in the path comprises increasing a channel width-to-length ratio of at least one transistor in an output stage of the current cell.

12. A method for reducing path delay sensitivity to temperature variation in a circuit, the method comprising the steps of
identifying at least one timing-critical path in the circuit, the path including a plurality of circuit cells coupled between an input and an output of the path;
using a computer to determine a temperature slope coefficient of the path;
when the slope coefficient is negative, increasing the slope coefficient by controlling at least one characteristic of at least one of the cells in the path; and
when the slope coefficient is positive, decreasing the slope coefficient by controlling at least one characteristic of at least one of the cells in the path,
wherein the step of decreasing the slope coefficient comprises, for at least a current cell in the path, at least one of controlling an output slew rate of the current cell, controlling an output slew rate of a cell coupled to and immediately preceding the current cell, and controlling an output load of the current cell, and
wherein the step of controlling an output slew rate of the cell coupled to and immediately preceding the current cell comprises:
obtaining a new previous cell having a higher drive strength than an existing previous cell coupled to and immediately preceding the current cell in the path;
comparing a first temperature slope coefficient of the path, as a function of the existing previous cell, with a second temperature slope coefficient of the path, as a function of the new previous cell having the higher drive strength; and
when the first temperature slope coefficient is less than the second temperature slope coefficient, calculating an overall temperature slope coefficient of the path and replacing the existing previous cell with the new previous cell.

13. A method for reducing path delay sensitivity to temperature variation in a circuit, the method comprising the steps of:
identifying at least one timing-critical path in the circuit, the path including a plurality of circuit cells coupled between an input and an output of the path;
using a computer to determine a temperature slope coefficient of the path;
when the slope coefficient is negative, increasing the slope coefficient by controlling at least one characteristic of at least one of the cells in the path; and
when the slope coefficient is positive, decreasing the slope coefficient by controlling at least one characteristic of at least one of the cells in the path,
wherein the step of decreasing the slope coefficient comprises, for at least a current cell in the path, at least one of controlling an output slew rate of the current cell, controlling an output slew rate of a cell coupled to and immediately preceding the current cell, and controlling an output load of the current cell, and
wherein the step of controlling the output load of the current cell comprises:
connecting at least one buffer in the path between an output of the current cell and an input of a cell immediately following the current cell;
comparing a first temperature slope coefficient of the path, as a function of a first output load of the current cell without the at least one buffer, with a second temperature slope coefficient of the path, as a function of a second output load of the current cell with the at least one buffer connected thereto; and
when the first temperature slope coefficient is less than the second temperature slope coefficient, calculating an overall temperature slope coefficient of the path and replacing the first output load with the second output load.

14. A method for reducing path delay sensitivity to temperature variation in a circuit, the method comprising the steps of:
identifying at least one timing-critical path in the circuit, the path including a plurality of circuit cells coupled between an input and an output of the path;
using a computer to determine a temperature slope coefficient of the path;
when the slope coefficient is negative, increasing the slope coefficient by controlling at least one characteristic of at least one of the cells in the path; and
when the slope coefficient is positive, decreasing the slope coefficient by controlling at least one characteristic of at least one of the cells in the path,
wherein the step of increasing the slope coefficient comprises, for at least a current cell in the path, at least one of controlling an output slew rate of the current cell, controlling an output slew rate of a cell coupled to and immediately preceding the current cell, and controlling an output load of the current cell, and
wherein the step of controlling the output slew rate of the current cell comprises:
obtaining a new current cell having a higher drive strength than the current cell in the path;
comparing a first temperature slope coefficient of the path, as a function of the current cell, with a second temperature slope coefficient of the path, as a function of the new current cell having the higher drive strength; and
when the first temperature slope coefficient is greater than the second temperature slope coefficient, calculating an overall temperature slope coefficient of the path and replacing the current cell with the new current cell.

15. The method of claim 14, wherein the step of obtaining a new current cell having a higher drive strength than the current cell in the path comprises increasing a channel width-to-length ratio of at least one transistor in an output stage of the current cell.

16. A method for reducing path delay sensitivity to temperature variation in a circuit, the method comprising the steps of:
identifying at least one timing-critical path in the circuit, the path including a plurality of circuit cells coupled between an input and an output of the path;
using a computer to determine a temperature slope coefficient of the path;
when the slope coefficient is negative, increasing the slope coefficient by controlling at least one characteristic of at least one of the cells in the path; and when the slope coefficient is positive, decreasing the slope coefficient by controlling at least one characteristic of at least one of the cells in the path, wherein the step of increasing the slope coefficient comprises, for at least a current cell in the path, at least one of controlling an output slew rate of the current cell, controlling an output slew rate of a cell coupled to and immediately preceding the current cell, and controlling an output load of the current cell, and wherein the step of controlling an output slew rate of the cell coupled to and immediately preceding the current cell comprises:

obtaining a new previous cell having a higher drive strength than an existing previous cell coupled to and immediately preceding the current cell in the path;

comparing a first temperature slope coefficient of the path, as a function of the existing previous cell, with a second temperature slope coefficient of the path, as a function of the new previous cell having the higher drive strength; and when the first temperature slope coefficient is greater than the second temperature slope coefficient, calculating an overall temperature slope coefficient of the path and replacing the existing previous cell with the new previous cell.

17. A method for reducing path delay sensitivity to temperature variation in a circuit, the method comprising the steps of identifying at least one timing-critical path in the circuit, the path including a plurality of circuit cells coupled between an input and an output of the path;

using a computer to determine a temperature slope coefficient of the path;

when the slope coefficient is negative, increasing the slope coefficient by controlling at least one characteristic of at least one of the cells in the path; and when the slope coefficient is positive, decreasing the slope coefficient by controlling at least one characteristic of at least one of the cells in the path, wherein the step of increasing the slope coefficient comprises, for at least a current cell in the path, at least one of controlling an output slew rate of the current cell, controlling an output slew rate of a cell coupled to and immediately preceding the current cell, and controlling an output load of the current cell, and wherein the step of controlling the output load of the current cell comprises:

connecting at least one buffer in the path between an output of the current cell and an input of a cell immediately following the current cell;

comparing a first temperature slope coefficient of the path, as a function of a first output load of the current cell without the at least one buffer, with a second temperature slope coefficient of the path, as a function of a second output load of the current cell with the at least one buffer connected thereto; and when the first temperature slope coefficient is greater than the second temperature slope coefficient, calculating an overall temperature slope coefficient of the path and replacing the first output load with the second output load.

18. An apparatus for reducing path delay sensitivity to temperature variation in a circuit, the apparatus comprising:

memory; and at least one processor coupled to the memory, the at least one processor being operative: (i) to identify at least one path between an input and an output of the circuit that introduces to a signal passing therebetween a largest delay from the input of the circuit to the output of the circuit, the path including a plurality of circuit cells coupled between an input and an output of the path; (ii) to determine a temperature slope coefficient of the path; (iii) when the slope coefficient is negative, to increase the slope coefficient by controlling at least one characteristic of at least one of the cells in the path; and (iv) when the slope coefficient is positive, to decrease the slope coefficient by controlling at least one characteristic of at least one of the cells in the path.

19. The apparatus of claim 18, wherein the at least one processor is further operative to control at least one characteristic of at least one of the cells in the path so that the slope coefficient of the path is within a prescribed range of zero.

20. An article of manufacture for reducing path delay sensitivity to temperature variation in a circuit, the article comprising a non-transitory computer readable storage medium having one or more programs embodied therewith, wherein the one or more programs, when executed by a computer, perform steps of:

identifying at least one path between an input and an output of the circuit that introduces to a signal passing therebetween a largest delay from the input of the circuit to the output of the circuit, the path including a plurality of circuit cells coupled between an input and an output of the path;

determining a temperature slope coefficient of the path;

when the slope coefficient is negative, increasing the slope coefficient by controlling at least one characteristic of at least one of the cells in the path; and when the slope coefficient is positive, decreasing the slope coefficient by controlling at least one characteristic of at least one of the cells in the path.

* * * * *

UNITED STATES PATENT AND TRADEMARK OFFICE
CERTIFICATE OF CORRECTION

PATENT NO.       : 8,225,257 B2
APPLICATION NO.  : 12/251110
DATED            : July 17, 2012
INVENTOR(S)      : Alexander Tetelbaum Page 1 of 1

It is certified that error appears in the above-identified patent and that said Letters Patent is hereby corrected as shown below:

Claim 1, column 11, line 42, replace "manlier" with --manner--.

Claim 10, column 12, line 61, replace "anew" with --a new--.

Signed and Sealed this
Fifth Day of February, 2013

Teresa Stanek Rea
*Acting Director of the United States Patent and Trademark Office*